US006240751B1

(12) United States Patent
Marzolf et al.

(10) Patent No.: US 6,240,751 B1
(45) Date of Patent: Jun. 5, 2001

(54) OPERATOR FOR A LATCH SYSTEM

(75) Inventors: Ricci L. Marzolf; Julie Houdek, both of New Hampton, IA (US); Andrew Bools, Leicester; David Craft, Nottingham, both of (GB)

(73) Assignee: Tri/Mark Corporation, New Hampton, IA (US)

( * ) Notice: Subject to any disclaimer, the term of this patent is extended or adjusted under 35 U.S.C. 154(b) by 0 days.

(21) Appl. No.: 09/293,349

(22) Filed: Apr. 16, 1999

(51) Int. Cl.[7] .................................................... B60R 25/02
(52) U.S. Cl. .......................... 70/207; 70/451; 292/336.3; 292/348
(58) Field of Search ............................. 70/207, 220, 370, 70/371, 451, 475, DIG. 20; 292/336.3, 347, 348, DIG. 37

(56) References Cited

U.S. PATENT DOCUMENTS

| | | | | |
|---|---|---|---|---|
| 2,082,195 | * | 6/1937 | Williams | 70/475 X |
| 2,523,144 | * | 9/1950 | Ritchie | 292/348 |
| 2,784,995 | * | 3/1957 | Hawkins | 292/348 |
| 2,839,913 | * | 6/1958 | Friedman et al. | 70/475 |
| 2,931,206 | * | 4/1960 | Friedman et al. | 70/475 |
| 3,604,230 | * | 9/1971 | Tixier | 292/DIG. 37 X |
| 4,588,221 | * | 5/1986 | Miller et al. | 292/348 |
| 4,756,638 | * | 7/1988 | Neyret | 70/451 X |
| 4,784,418 | * | 11/1988 | Pearson et al. | 292/348 |
| 4,883,296 | * | 11/1989 | Laurie | 292/DIG. 37 X |
| 4,886,310 | * | 12/1989 | Cyr et al. | 292/DIG. 37 X |
| 4,910,982 | * | 3/1990 | Dana | 70/451 X |
| 4,951,980 | * | 8/1990 | Wetzel | 70/451 X |
| 5,435,159 | * | 7/1995 | Ramsauer | 70/451 X |
| 5,476,295 | * | 12/1995 | Smallegan et al. | 292/348 X |
| 5,505,065 | * | 4/1996 | Hesse | 70/451 X |
| 5,683,127 | * | 11/1997 | Chamberlain | 70/451 X |
| 5,941,108 | * | 8/1999 | Shen | 292/347 X |

FOREIGN PATENT DOCUMENTS

| | | | | |
|---|---|---|---|---|
| 3030519 | * | 2/1982 | (DE) | 70/207 |
| 3103026 | * | 8/1982 | (DE) | 70/207 |
| 3241561 | * | 6/1984 | (DE) | 70/207 |
| 2226358 | * | 6/1990 | (GB) | 70/207 |

* cited by examiner

*Primary Examiner*—Suzanne Dino Barrett
(74) *Attorney, Agent, or Firm*—Wood, Phillips, VanSanten, Clark & Mortimer

(57) ABSTRACT

An operator for a latch system. The operator has a main body, a control unit, and a retainer. The control unit has at least a portion that is selectively repositionable relative to the main body by a user with the control unit in an operative position on the main body to change the state of a latch system with which the operator is associated. A retainer is placeable in an assembled position on the main body wherein the retainer maintains the control unit in the operative position. The main body has a first shoulder, with the retainer element having a second shoulder. The first and second shoulders face and abut each other with the retainer in the assembled position to prevent the retainer from being moved out of the assembled position such that the control unit could be moved out of the operative position. There are cooperating surfaces on the main body and retainer which guide the retainer and main body each against the other to allow the retainer to be guidingly moved against and relative to the main body from a first position relative to the main body into the assembled position. At least a part of at least one of the main body and retainer is deformable and is deformed as an incident of the retainer moving from the first position into the assembled position whereupon the first and second shoulders face and abut each other to prevent the retainer from being moved out of the assembled position.

17 Claims, 5 Drawing Sheets

OPERATOR FOR A LATCH SYSTEM

BACKGROUND OF THE INVENTION

1. Field of the Invention

This invention relates to latch systems, as commonly used on repositionable closure elements and, more particularly, to an operator for such latch systems.

2. Background Art

It is known to construct operators for latch systems using a U-shaped main body with a control unit that is selectively repositionable relative to the main body to change the state of a latch system with which the operator is associated. In one form, the control unit is a push button actuator which can be engaged and depressed by a finger on a user's hand that is grasping the main body. The control unit is captively held in the operative position by a plate which is attached to the main body through the use of fasteners. The fasteners must be inventoried and assembled in a separate manufacturing step.

Typically, the exposed portion of the main body has a fixed configuration and appearance. If a customer wishes to obtain an operator with a different appearance, typically the entire main body would be custom built for that particular customer's needs. This may necessitate that the fully assembled operators be separately stored and tracked by customer.

SUMMARY OF THE INVENTION

In one form, the invention is directed to an operator for a latch system. The operator has a main body, a control unit, and a retainer. The control unit has at least a portion that is selectively repositionable relative to the main body by a user with the control unit in an operative position on the main body to change the state of a latch system with which the operator is associated. A retainer is placeable in an assembled position on the main body wherein the retainer maintains the control unit in the operative position. The main body has a first shoulder, with the retainer element having a second shoulder. The first and second shoulders face and abut each other with the retainer in the assembled position to prevent the retainer from being moved out of the assembled position such that the control unit could be moved out of the operative position. There are cooperating surfaces on the main body and retainer which guide the retainer and main body each against the other to allow the retainer to be guidingly moved against and relative to the main body from a first position relative to the main body into the assembled position. At least a part of at least one of the main body and retainer is deformable and is deformed as an incident of the retainer moving from the first position into the assembled position whereupon the first and second shoulders face and abut each other to prevent the retainer from being moved out of the assembled position.

In one form, the retainer is moved in a predetermined path in a first direction as the retainer is moved from the first position into the assembled position. The first and second shoulders prevent the retainer from being moved from the assembled position in the predetermined path oppositely to the first direction into the first position.

The predetermined path may be a substantially straight path.

The control unit may be captively maintained in the operative position between the retainer and main body with the retainer in the assembled position.

In one form, the retainer is a single piece and there is no fastener separate from the retainer that extends into the retainer for maintaining the retainer in the assembled position.

In one form, the retainer has first and second spaced walls which straddle the main body.

The operator has an exposed external surface. In one form, the first and second spaced walls define a part of the exposed external surface of the operator.

The main body may have an overall U shape with a base and first and second spaced legs. The base is graspable by a hand of a user, with the spaced legs defining first and second spaced mounting portions which are abuttable and attachable to a closure element on which the operator is used. The control unit is on the first mounting portion.

The control unit may have a depressible, push button actuator which can be engaged and depressed by a finger on a user's hand that is grasping the base of the main body.

The control unit may have a keyed element which can be repositioned to change the control unit between a locked state and an unlocked state.

The retainer may be at least one of a) a non-metallic material, b) a composite material, and c) a plastic material.

In one form, a first finger projects in cantilever fashion from one of the retainer and main body and defines one of the first and second shoulders, with the first finger deforming as an incident of the retainer moving from the first position into the assembled position.

In one form, the main body has a third shoulder and the retainer a fourth shoulder. The third and fourth shoulders face and abut each other with the retainer in the assembled position to prevent the retainer from being moved out of the assembled position. Another part of the at least one of the main body and retainer is deformable and is deformed as an incident of the retainer moving from the first position into the assembled position whereupon the third and fourth shoulders face and abut each other to prevent the retainer from being moved out of the assembled position.

A first finger may project in cantilever fashion from one of the retainer and main body and defines one of the third and fourth shoulders. A second finger is spaced from and projects in cantilever fashion from one of the retainer and the main body and defines one of the first and second shoulders. The first and second fingers each deform as an incident of the retainer moving from the first position into the assembled position.

In one form, the control unit has a push button actuator which is translated in a first line between depressed and undepressed positions and the first and second fingers are diametrically oppositely located with respect to the first line.

The control unit may have a plunger that moves guidingly against the retainer in the first line as the push button actuator translates between the depressed and undepressed positions.

A spring element may act between the retainer and push button actuator to normally urge the push button actuator towards the undepressed position.

The retainer may define a receptacle for a part of the spring element.

The invention is also directed to a method of assembling an operator for a latch system, which operator has a main body with a first shoulder, a control unit, and a retainer with a second shoulder. The method involves the steps of placing the control unit in an operative position on the main body so that at least a portion of the control unit is repositionable relative to the main body by a user to thereby change the state of a latch system with which the operator is associated, and moving the retainer from a) a first position relative to the main body wherein the retainer is fully separated from the main body into b) an assembled position by moving the retainer guidingly against the main body in a predetermined path in a first direction and thereby causing at least a part of at least one of the retainer and main body to deform. This allows the first and second shoulders to face and abut each other with the retainer in the assembled position so that the retainer element is prevented by the shoulders from moving from the assembled position into the first position by movement of the retainer in the first path oppositely to the first direction.

The invention also contemplates a kit for an operator for a latch system. The kit has a main body, a control unit that has at least a portion that is selectively repositionable relative to the main body by an operator with the control unit in an operative position on the main body to change the state of a latch system with which the operator is associated, a first retainer and a second retainer. The first retainer is placeable in an assembled position on the main body wherein the first retainer maintains the control unit in the operative position. The second retainer is placeable in an assembled position on the main body in place of the first retainer wherein the second retainer maintains the control unit in the operative position. The second retainer is different from the first retainer in at least one of a) appearance, b) shape, and c) material.

In one form, there is a first shoulder on the main body and a second shoulder on the first retainer which face and abut each other with the first retainer in the assembled position for the first retainer to prevent the first retainer from being moved out of the assembled position for the first retainer such that the control unit could be moved out of the operative position. There are cooperating surfaces on the main body and first retainer which guide the first retainer and main body each against the other to allow the first retainer to be guidingly moved against and relative to the main body from a first position relative to the main body into the assembled position for the first retainer. At least a part of at least one of the main body and first retainer is deformable and is deformed as an incident of the first retainer moving from the first position into the assembled position for the first retainer, whereupon the first and second shoulders face and abut each other to prevent the first retainer from being moved out of the assembled position for the first retainer.

A third shoulder may be provided on the second retainer and the first and third shoulders face each other with the second retainer in the assembled position for the second retainer to prevent the second retainer from being moved out of the assembled position for the second retainer such that the control unit could be moved out of the operative position. The cooperating surfaces on the main body and second retainer guide the second retainer and main body each against the other to allow the second retainer to be guidingly moved against and relative to the main body from a first position for the second retainer relative to the main body into the assembled position for the second retainer. At least a part of at least one of the main body and second retainer is deformable and is deformed as an incident of the second retainer moving from the first position for the second retainer into the assembled position for the second retainer, whereupon the first and third shoulders face and abut each other to prevent the second retainer from being moved out of the assembled position for the second retainer.

DETAILED DESCRIPTION OF THE DRAWINGS

Figure 1:
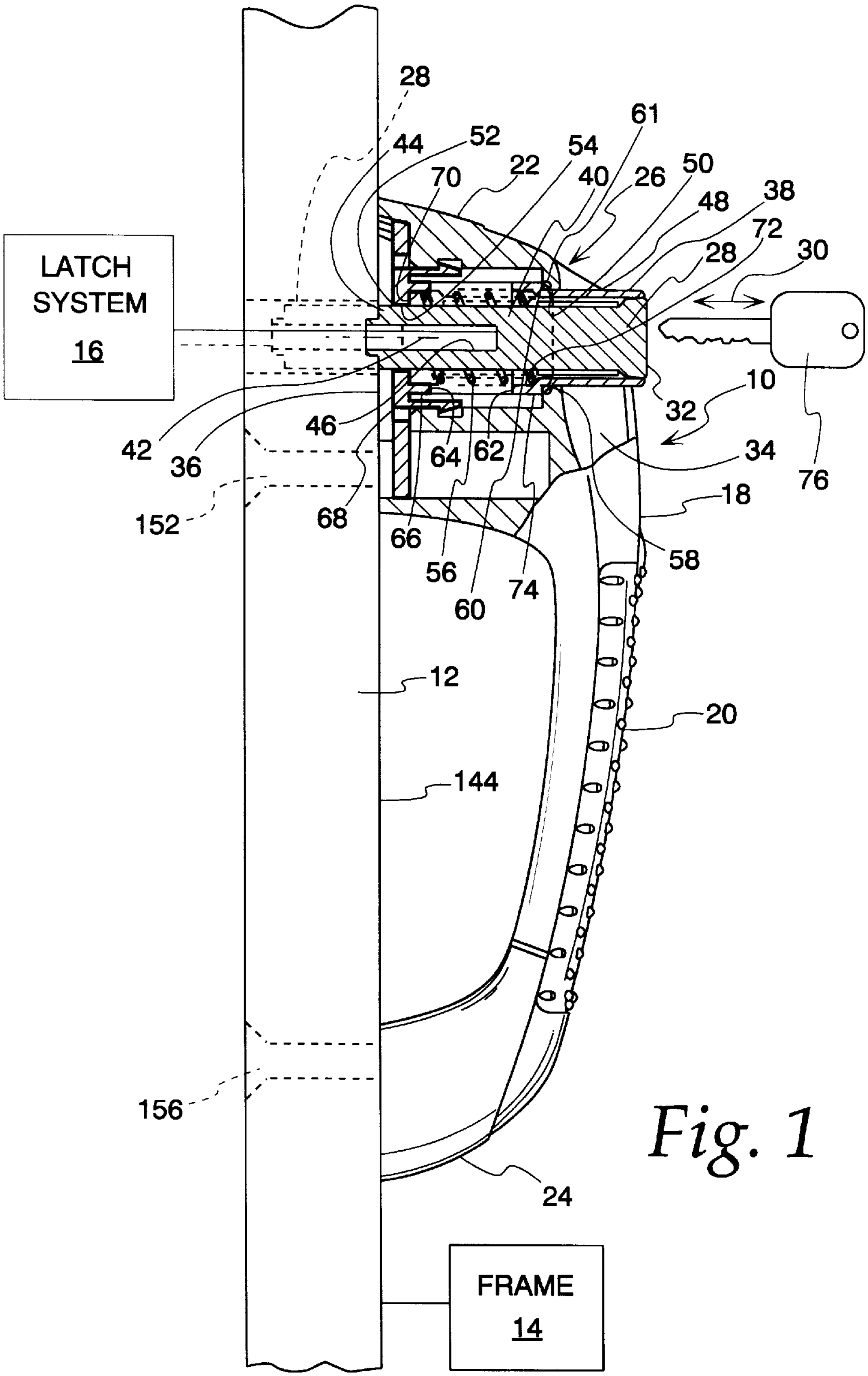
FIG. 1 is a fragmentary, side elevation view of an operator, according to the present invention, operatively connected to a latch system on a closure element which is mounted for movement relative to a frame.
Figure 2:
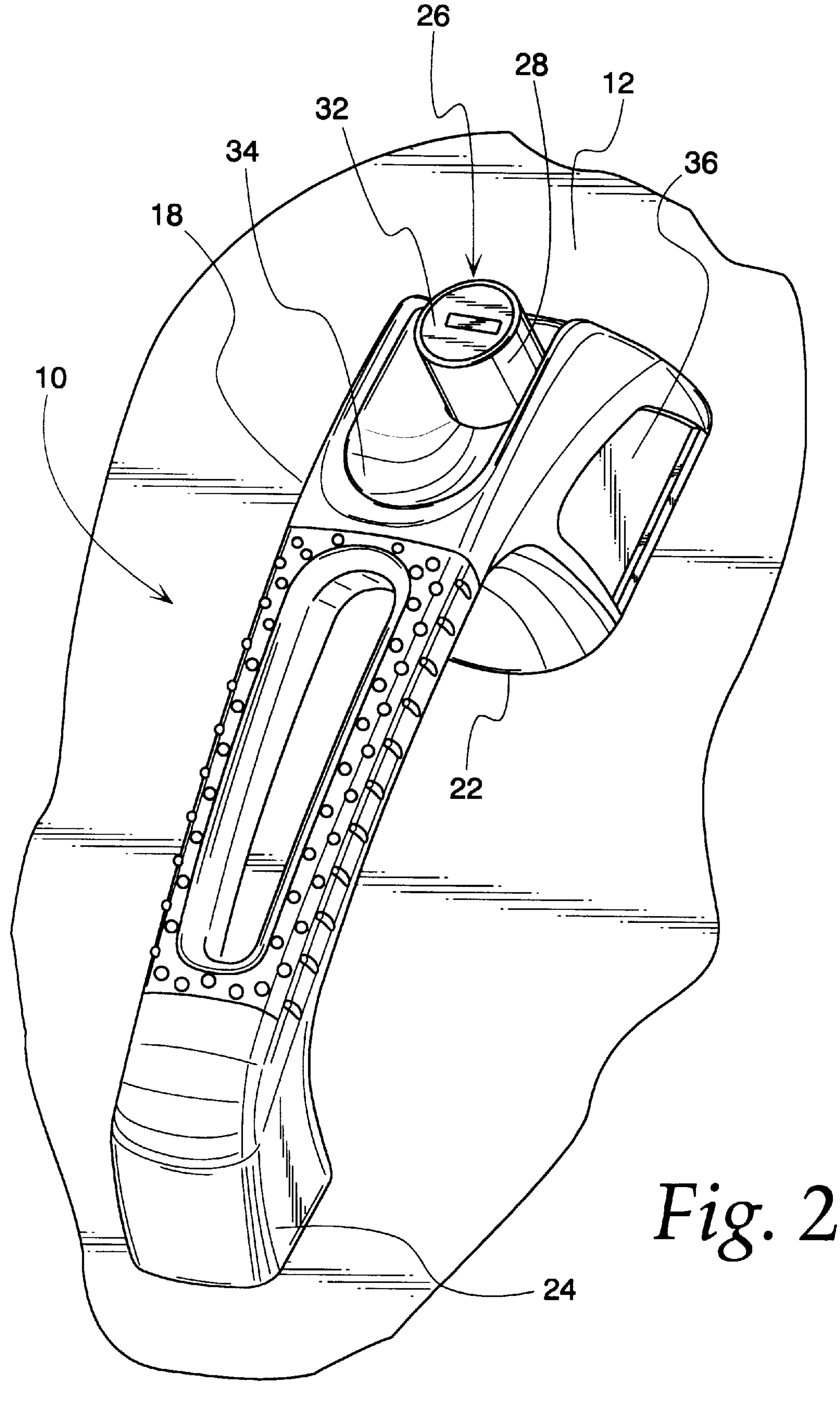
FIG. 2 is a fragmentary, perspective view of the inventive operator on the closure element FIG. 1.
Figure 3:
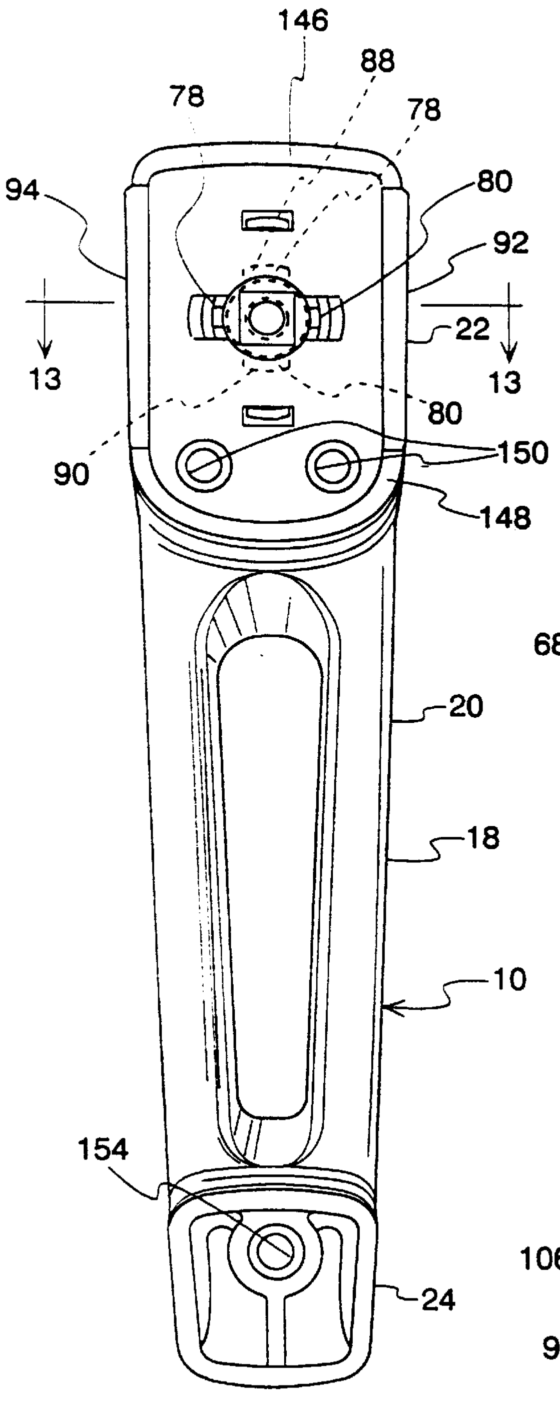
FIG. 3 is a rear elevation view of the inventive operator.
Figure 4:
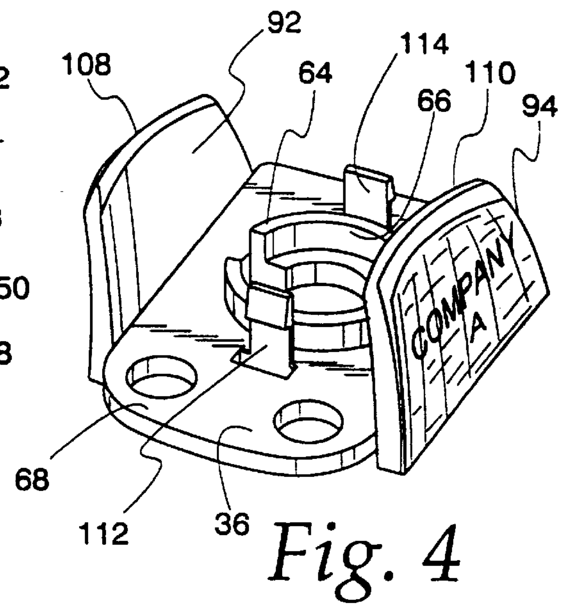
FIG. 4 is a perspective view of a retainer for a control unit on the inventive operator.
Figure 13:
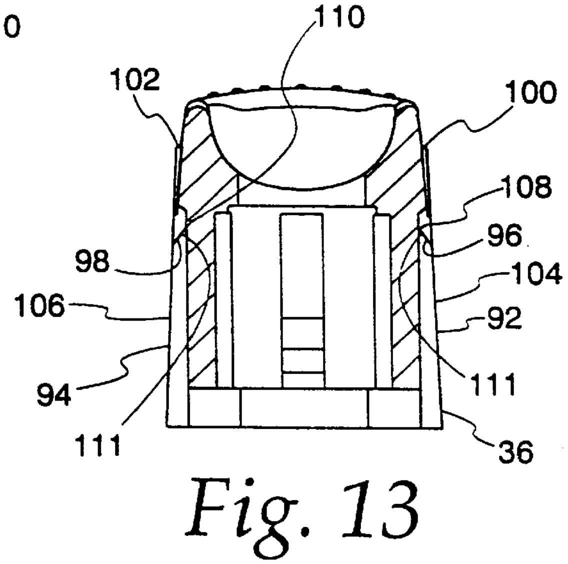
FIG. 13 is a cross-sectional view of the retainer taken along line 13—13 of FIG.

Referring initially to FIG. 1, an operator 10, according to the present invention, is shown operatively connected to a closure element 12. The closure element 12 is mounted to a frame 14 for movement relative thereto between first and second different positions, which may be open and closed positions. A latch system 16 on the closure element 12 releasably maintains the closure element 12 in one of the first and second positions therefor. The latch system 16 is controlled by the inventive operator 10. The closure element 12 and latch system 16 can take a myriad of different forms. For example, the closure element 12 could be pivotable or translatable between the first and second positions therefor. The latch system 16 could include a rotatable catch, a translatable bolt, etc., to cooperate with a strike plate or strike bolt on the frame 14. The precise configuration of the closure element 12 and latch system 16 are not critical to the present invention.

Briefly, the operator 10 consists of a U-shaped main body 18 with a hand graspable base portion 20 and spaced legs 22, 24 which define mounting portions through which the operator 10 is attached to the closure element 12.

A control unit 26 is mounted in an operative position on the mounting portion 22. The control unit 26 consists of a push button actuator 28 which is movable in a line indicated by the double-headed arrow 30 between an undepressed position, as shown in solid lines in FIG. 1, and a depressed position, as shown in phantom lines in that same Figure.

By grasping the base portion 20 in conventional manner, the user's thumb can be pressed against a surface 32 of the actuator 28 to move the actuator 28 from the undepressed position to the depressed position. As this occurs, the actuator 28 changes the state of the latch system 16, i.e. from latched state to unlatched state, or the like. To accommodate the user's thumb and permit full depression of the actuator 28, a recess 34 is formed in the main body 18 in the vicinity of the actuator 28. The grasped base portion 20 can then be used to reposition the closure element 12, as desired.

A retainer 36 is separately formed from the main body 18 and is joined to the main body 18 and, in an assembled position therefor, as shown in FIG. 1, captively maintains the control unit in the operative position on the main body 18. The details of the retainer 36, the main body 18, and the control unit 26, and the cooperation therebetween, will now be described in greater detail with reference additionally to FIGS. 2–13.

The push button actuator 28 consists of a housing 38 and a lock cylinder 40 received by the housing 38 so that the lock cylinder 40 is rotatable relative to the housing 38 around a central axis 42. The lock cylinder 40 has a plunger 44 thereon which has a receptacle 46 for receiving an interconnect element (not shown) on the latch system 16. The housing 38 and lock cylinder 40 move as one piece in the line of the double-headed arrow 30 as the actuator 28 is changed between the depressed and undepressed positions therefor. As this occurs, the outer surface 48 of the housing 38 is guided against a complementary annular surface 50 on the main body 18. Simultaneously, the outer surface 52 of the plunger 44 is guided against a surrounding, annular surface 54 defined by the retainer 36.

A coil spring 56 surrounds the lock cylinder 40 and acts between the retainer 36 and housing 38 to normally bias the actuator 28 into the undepressed position therefor. With the actuator 28 in the undepressed position, an angled, annular surface 58 on the housing 38 facially abuts to a complementary, annular surface 60 on the main body 18. A sealing O-ring 61 may be used between the surfaces 58, 60. In the depressed position for the actuator 28, an annular edge 62 on the housing 38 abuts to an annular edge 64 defined by a ring-shaped projection 66 from a base wall 68 on the retainer 36.

The projection 66 defines a receptacle 70 around the actuator 28 for one end of the coil spring 56. A receptacle 72 for the other end of the coil spring 56 is defined between the actuator 28 and a radially enlarged flange 74 on the housing 38.

The lock cylinder 40 is rotatable relative to the housing 38 through a key 76 which controls tumblers (not shown) in conventional fashion to selectively change the control unit 26 between locked and unlocked states. The lock cylinder 40 is rotatable around the axis 42 through 90° between locked and unlocked positions. In the unlocked position for the lock cylinder 40, radially projecting and longitudinally extending, diametrically oppositely located, ribs 78, 80 align, one each with ends 82, 84 of an opening 86 through the base wall 68 of the retainer 36, so that the ribs 78, 80 can pass through the base wall 68 without interference as the actuator 28 is moved from the undepressed position into the depressed position.

With the lock cylinder 40 rotated to the locked position, ends 88, 90 of the ribs 78, 80 are situated to abut to the base wall 68 within the receptacle 70 so that the actuator 28 is prohibited from moving from the undepressed position fully into the depressed position as would change the state of the latch system 16.

The retainer 36 has spaced walls 92,94 which project upwardly from the base wall 68 and are configured and spaced so as to straddle the main body 18 at the mounting portion 22. The main body 18 has undercuts 96, 98, at the side surfaces thereof, to accommodate the walls 92, 94 so that external side surfaces 100, 102 of the main body 18 blend smoothly into exposed, external surfaces 104, 106 of the walls 92, 94, respectively. The walls 92, 94 thus become exposed over a substantial area of the mounting portion 22 on the main body 18. The walls 92, 94 have pointed ends 108, 110 which lockingly engage within complementary receptacles 111 defined by the undercuts 96, 98.

First and second fingers 112, 114 project in cantilevered fashion forwardly from the base wall 68 at diametrically opposite locations relative to the axis 42. The fingers 112, 114 each cooperate with the main body 18 in such a manner that the retainer 36 can be simply press fit into the assembled position on the main body 18 and maintained thereon without the need for separate fasteners.

Exemplary finger 112 has a leading edge 116 which blends into a cam surface 118. The cam surface 118 terminates at an axially facing shoulder 120 at the end of the cam surface 118 remote from the leading edge 116.

Figure 6:
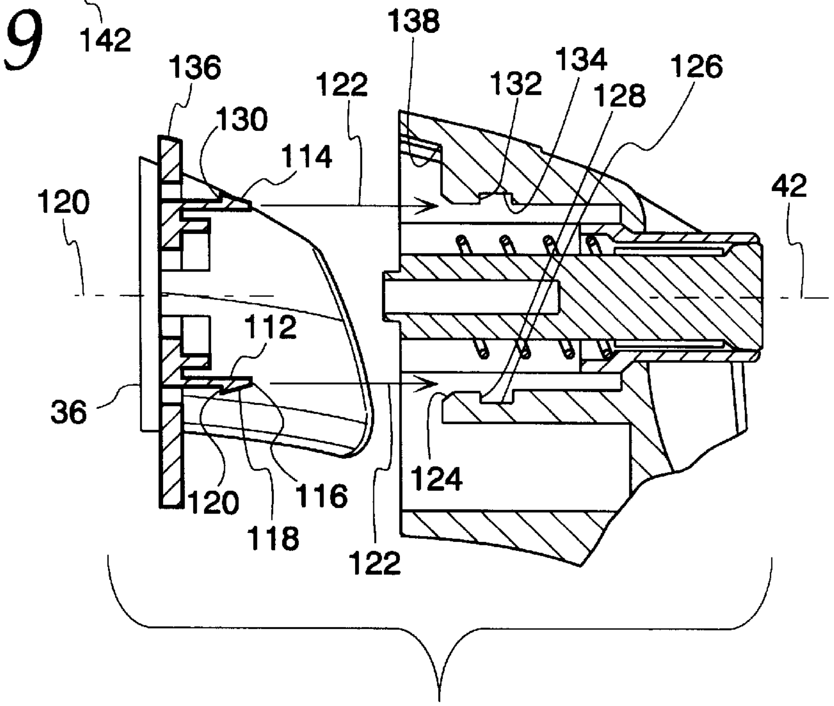
FIG. 6 is an exploded, fragmentary, cross-sectional view of the inventive operator showing a first pre-assembly position for the retainer in relationship to a main body.
Figure 7:
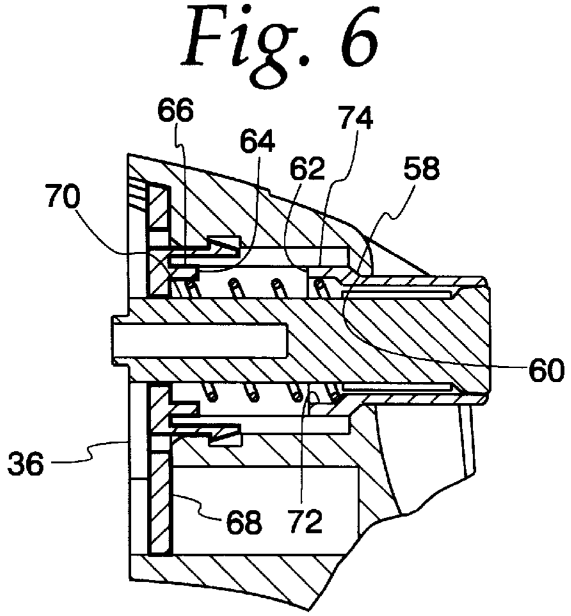
FIG. 7 is a view as in FIG. 6 with the retainer in an assembled position on the main body.

To unite the main body 18 and retainer 36, the retainer 36 is initially aligned in a first position, as shown in FIG. 6, wherein the retainer 36 is fully separated from the main body 18. The axis 42 of the actuator 28 is aligned with the central axis 120 of the retainer opening 86. By then directing the retainer 36 in the line of the arrows 122 from the first position therefor in FIG. 6, the cam surface 118 initially contacts a ramp surface 124 on the main body 18. Continued movement of the retainer 36 in the direction of the arrows 122, through the interaction of the surfaces 118, 124, progressively deflects/deforms the finger 112 in a radially inward direction relative to the axis 42 sufficiently to allow the shoulder 120 to move axially up to a recess 126 in the main body 18, whereupon the finger 112 is allowed to move into the recess 126. The required deflection/deformation of the finger 112 in the embodiment shown is made possible by selecting the dimensions and materials so that the finger 112 bends under the assembly force. Alternative arrangements that produce a "hinge" for the finger 112 could also be used. The restoring force in the deflected/deformed finger 112 urges the finger 112 into the recess 126 towards an undeformed/undeflected state sufficiently that the shoulder 120 is placed in facing relationship with a shoulder 128 on the main body 18 bounding the recess 126. The retainer 36 realizes the assembled position as this occurs with the control unit 26 being thereby held captive in the operative position between the retainer 36 and main body 18. The shoulders 120, 128 face and abut to each other to prevent the retainer 36 from being moved from the assembled position back into the first position therefor by movement relative to the main body 18 in the same line of movement as assembly was effected, but in the direction opposite to that indicated by the arrows 122, as would allow the control unit 26 to be moved out of the operative position therefor. The finger 114 cooperates in the same manner to place a shoulder 130 thereon in facing relationship with a shoulder 132 bounding a recess 134 on the main body 18 with the retainer 36 in the assembled position. In the assembled position, the peripheral edge 136 of the retainer 36 nests in a complementary undercut 138 in the main body 18.

With this construction, the retainer 36 can be press fit into the assembled position and maintained therein without the need for separate fasteners. While separate fasteners could additionally be employed, the invention may obviate the need for such fasteners.

The walls 92, 94 extends slightly rearwardly beyond the base wall 68 of the retainer 36 and define edges 140, 142 which are abuttable to a mounting surface 144 of the closure element 12 with the operator 10 operatively connected thereto. The main body 18 has discrete edges 146, 148 which are likewise intended to abut to the closure mounting surface 144 and, together with the edges 140, 142 on the retainer 36, define a continuous edge for bearing upon the closure 12.

The mounting portion 22 has blind, threaded bores 150 therein to accept threaded fasteners 152 directed through the closure 12 on the side opposite that to which the operator 10 is mounted. A similar bore 154 is provided in the mounting portion 24 to accept a threaded fastener 156.

With the retainer 36 so constructed, the base wall 68 and walls 92, 94, together with the fingers 112, 114 and projection 66, can all be formed as one piece, as by injection molding plastic. The main body 18 can be formed from plastic or a dissimilar material. Metal inserts can be incorporated to define the bores 150, 154.

Figure 5:
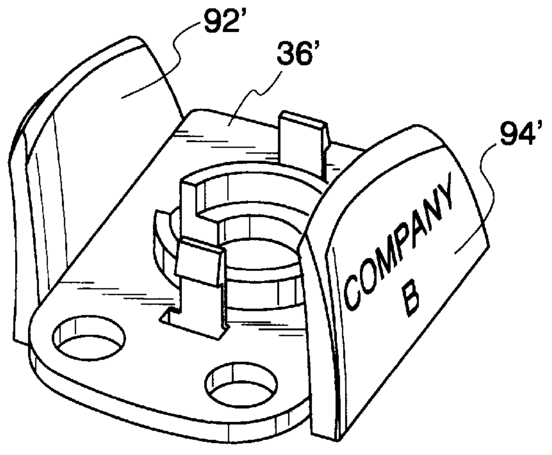
FIG. 5 is a view as in FIG. 4 of a modified form of retainer.
Figure 8:
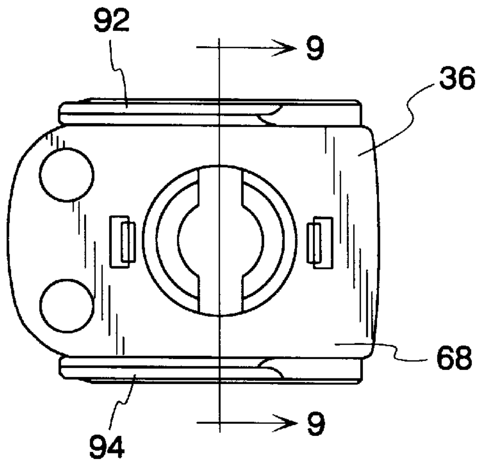
FIG. 8 is a front elevation view of the retainer.
Figure 12:
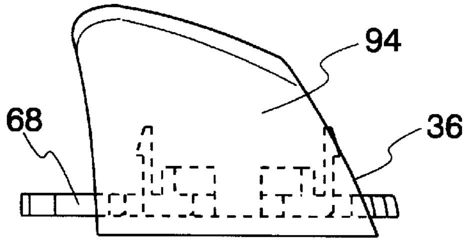
FIG. 12 is a side elevation view of the retainer.
Figure 11:
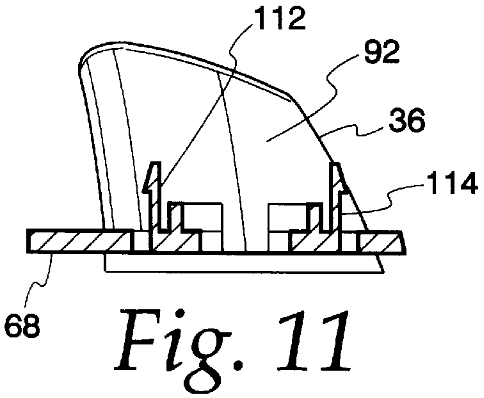
FIG. 11 is a cross-sectional view of the retainer taken along line 11—11 of FIG. 10.
Figure 10:
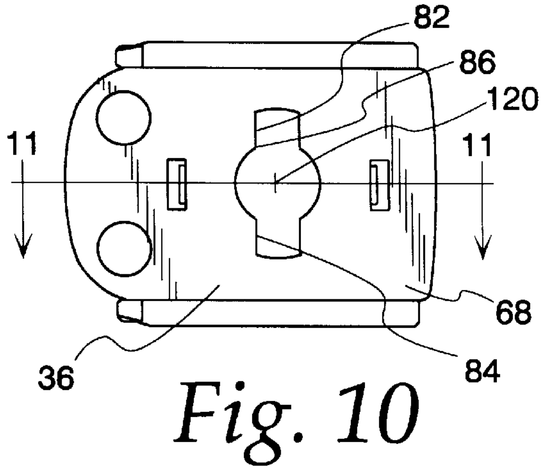
FIG. 10 is a rear elevation view of the retainer.
Figure 9:
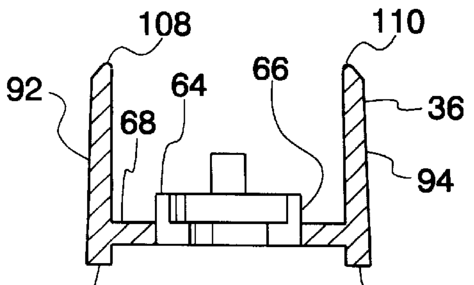
FIG. 9 is a cross-sectional view of the retainer taken along line 9—9 of FIG. 8.

With this arrangement, not only does the press fit retainer 36 potentially facilitate assembly of the operator 10, but it also permits convenient aesthetic enhancement and customizing of the operator 10. For example, in FIG. 4, the retainer 36 is shown to have walls 92, 94 with a texture and a logo "company A". In FIG. 5, a similarly configured retainer 36' has untextured walls 92', 94' and a different designation "company B". Thus a universal main body construction may be used while interchanging retainers 36, 36'. The operators 10 can then be sold to purveyors thereof in a kit form which allows mixing of retainers 36, 36' with the common main body 18.

Various aesthetic enhancements can be made to the operator 10 as shown. For example, the walls 92, 94 can be changed in shape and can be made in different colors, with different indicia thereon, etc. The retainer 36 and/or the main body 18 can be made from the same or different materials. Among the available options are a non-metallic material, composite materials, plastic materials, metals, etc.

The foregoing disclosure of specific embodiments is intended to be illustrative of the broad concepts comprehended by the invention.

What is claimed is:

1. An operator for a latch system, said operator comprising:

a main body that is abuttable to a mounting surface with the operator operatively connected to a mounting surface;

a control unit that has at least a portion that is selectively repositionable relative to the main body by an operator with the control unit in an operative position on the main body to change the state of a latch system with which the operator is associated; and a retainer that is placeable in an assembled position on the main body wherein the retainer maintains at least a part of the control unit in the operative position by captively maintaining the at least part of the control unit between the retainer and the main body, wherein there is a first shoulder on the main body and a second shoulder on the retainer which face and abut each other with the retainer in the assembled position to prevent the retainer from being moved out of the assembled position such that the control unit could be moved out of the operative position, wherein there are cooperating surfaces on the main body and the retainer which guide the retainer and main body each against the other to allow the retainer to be guidingly moved against and relative to the main body from a first position relative to the main body into the assembled position, wherein at least a part of at least one of the main body and retainer is deformable and is deformed as an incident of the retainer moving from the first position into the assembled position whereupon the first and second shoulders face and abut each other to prevent the retainer from being moved out of the assembled position, wherein the retainer is captively maintained between the main body and a mounting surface to which the operator is operably connected.

2. The operator for a latch system according to claim 1 wherein the retainer is moved in a predetermined path in a first direction as the retainer is moved from the first position into the assembled position and the first and second shoulders prevent the retainer from being moved from the assembled position in the predetermined path oppositely to the first direction into the first position.

3. The operator for a latch system according to claim 1 wherein the retainer comprises a single piece and there is no fastener separate from the retainer that extends into the retainer for maintaining the retainer in the assembled position.

4. The operator for a latch system according to claim 1 wherein the retainer comprises at least one of a) a non-metallic material, b) a composite material, and c) a plastic material.

5. The operator for a latch system according to claim 2 wherein the predetermined path is substantially a straight path.

6. The operator for a latch system according to claim 1 wherein there is a first finger projecting in cantilever fashion from one of the retainer and main body and defining one of the first and second shoulders, the first finger deforming as an incident of the retainer moving from the first position into the assembled position.

7. The operator for a latch system according to claim 1 wherein there is a third shoulder on the main body and a fourth shoulder on the retainer which face and abut each other with the retainer in the assembled position to prevent the retainer from being moved out of the assembled position and another part of at least one of the main body and retainer is deformable and is deformed as an incident of the retainer moving from the first position into the assembled position whereupon the third and fourth shoulders face and abut each other to prevent the retainer from being moved out of the assembled position.

8. The operator for a latch system according to claim 7 wherein there is a first finger projecting in cantilever fashion from one of the retainer and main body and defining one of the third and fourth shoulders, there is a second finger spaced from and projecting in cantilever fashion from one of the retainer and main body and defining one of the first and second shoulders, and the first and second fingers each deform as an incident of the retainer moving from the first position into the assembled position.

9. An operator for a latch system, said operator comprising:

a main body;

a control unit that has at least a portion that is selectively repositionable relative to the main body by an operator with the control unit in an operative position on the main body to change the state of a latch system with which the operator is associated; and a retainer that is placeable in an assembled position on the main body wherein the retainer maintains the control unit in the operative position, wherein there is a first shoulder on the main body and a second shoulder on the retainer element which face and abut each other with the retainer in the assembled position to prevent the retainer from being moved out of the assembled position such that the control unit could be moved out of the operative position, wherein there are cooperating surfaces on the main body and the retainer which guide the retainer and main body each against the other to allow the retainer to be guidingly moved against and relative to the main body from a first position relative to the main body into the assembled position, wherein at least a Dart of at least one of the main body and retainer is deformable and is deformed as an incident of the retainer moving from the first position into the assembled position whereupon the first and second shoulders face and abut each other to prevent the retainer from being moved out of the assembled position, wherein the retainer comprises first and second spaced walls which straddle the main body.

10. The operator for a latch system according to claim 9 wherein the operator has an exposed external surface and the first and second spaced walls define a part of the exposed external surface of the operator.

11. An operator for a latch system, said operator comprising:

a main body;

a control unit that has at least a portion that is selectively repositionable relative to the main body by an operator with the control unit in an operative position on the main body to change the state of a latch system with which the operator is associated; and a retainer that is placeable in an assembled position on the main body wherein the retainer maintains the control unit in the operative position, wherein there is a first shoulder on the main body and a second shoulder on the retainer which face and abut each other with the retainer in the assembled position to prevent the retainer from being moved out of the assembled position such that the control unit could be moved out of the operative position, wherein there are cooperating surfaces on the main body and the retainer which guide the retainer and main body each against the other to allow the retainer to be guidingly moved against and relative to the main body from a first position relative to the main body into the assembled position, wherein at least a part of at least one of the main body and retainer is deformable and is deformed as an incident of the retainer moving from the first position into the assembled position whereupon the first and second shoulders face and abut each other to prevent the retainer from being moved out of the assembled position, wherein the main body has an overall U shape with a base and first and second spaced legs, the base is graspable by a hand of a user and the spaced legs comprise first and second spaced mounting portions which are abuttable and attachable to a closure element on which the operator is used, and the control unit is on the first mounting portion.

12. The operator for a latch system according to claim 11 wherein the control unit comprises a depressible push button actuator which can be engaged and depressed by a finger on a user's hand that is grasping the base of the main body.

13. The operator for a latch system according to claim 12 wherein the control unit comprises a keyed element which can be repositioned to change the control unit between a locked state and an unlocked state.

14. An operator for a latch system, said operator comprising:

a main body;

a control unit that has at least a portion that is selectively repositionable relative to the main body by an operator with the control unit in an operative position on the main body to change the state of a latch system with which the operator is associated; and a retainer that is placeable in an assembled position on the main body wherein the retainer maintains the control unit in the operative position, wherein there is a first shoulder on the main body and a second shoulder on the retainer which face and abut each other with the retainer in the assembled position to prevent the retainer from being moved out of the assembled position such that the control unit could be moved out of the operative position, wherein there are cooperating surfaces on the main body and the retainer which guide the retainer and main body each against the other to allow the retainer to be guidingly moved against and relative to the main body from a first position relative to the main body into the assembled position, wherein at least a Dart of at least one of the main body and retainer is deformable and is deformed as an incident of the retainer moving from the first position into the assembled position whereupon the first and second shoulders face and abut each other to prevent the retainer from being moved out of the assembled position, wherein there is a third shoulder on the main body and a fourth shoulder on the retainer which face and abut each other with the retainer in the assembled position to prevent the retainer from being moved out of the assembled Position and another part of at least one of the main body and retainer is deformable and is deformed as an incident of the retainer moving from the first position into the assembled position whereupon the third and fourth shoulders face and abut each other to prevent the retainer from being moved out of the assembled position, wherein there is a first finger protecting in cantilever fashion from one of the retainer and main body and defining one of the third and fourth shoulders, there is a second finger spaced from and projecting in cantilever fashion from one of the retainer and main body and defining one of the first and second shoulders, and the first and second fingers each deform as an incident of the retainer moving from the first position into the assembled position, wherein the control unit comprises a push button actuator which is translatable in a first line between depressed and undepressed positions and the first and second fingers are diametrically oppositely located with respect to the first line.

15. An operator for a latch system, said operator comprising:

a main body;

a control unit that has at least a portion that is selectively repositionable relative to the main body by an operator with the control unit in an operative position on the main body to change the state of a latch system with which the operator is associated; and a retainer that is placeable in an assembled position on the main body wherein the retainer maintains the control unit in the operative position, wherein there is a first shoulder on the main body and a second shoulder on the retainer which face and abut each other with the retainer in the assembled position to prevent the retainer from being moved out of the assembled position such that the control unit could be moved out of the operative position, wherein there are cooperating surfaces on the main body and the retainer which guide the retainer and main body each against the other to allow the retainer to be guidingly moved against and relative to the main body from a first position relative to the main body into the assembled position, wherein at least a part of at least one of the main body and retainer is deformable and is deformed as an incident of the retainer moving from the first position into the assembled position whereupon the first and second shoulders face and abut each other to prevent the retainer from being moved out of the assembled position, wherein the control unit comprises a push button actuator which is translatable in a first line between depressed and undepressed positions, and the control unit comprises a plunger that moves guidingly against the retainer in the first line as the push button actuator translates between the depressed and undepressed positions.

16. The operator for a latch system according to claim 15 wherein a spring element acts between the retainer and push button actuator to normally urge the push button actuator towards the undepressed positions.

17. The operator for a latch system according to claim 16 wherein the retainer defines a receptacle for a part of the spring element.

* * * * *